United States Patent
Huang et al.

(10) Patent No.: US 8,337,070 B2
(45) Date of Patent: Dec. 25, 2012

(54) BACKLIGHT MODULE

(75) Inventors: Chen-sing Huang, Yingge Township (TW); Po-fu Kuo, Taipei (TW); Cheng-sheng Chiang, Sanxia Township (TW)

(73) Assignee: Chungwha Picture Tubes, Ltd., Bade, Taoyuan (TW)

( * ) Notice: Subject to any disclaimer, the term of this patent is extended or adjusted under 35 U.S.C. 154(b) by 146 days.

(21) Appl. No.: 12/951,036

(22) Filed: Nov. 20, 2010

(65) Prior Publication Data

US 2012/0033446 A1     Feb. 9, 2012

(30) Foreign Application Priority Data

Aug. 6, 2010   (TW) ................................ 99215135 U

(51) Int. Cl.
  *F21V 7/04*     (2006.01)
(52) U.S. Cl. .................. 362/634; 362/631; 362/632
(58) Field of Classification Search .................. 362/603, 362/605, 612, 613, 630, 631, 634
  See application file for complete search history.

(56) References Cited

U.S. PATENT DOCUMENTS

| | | | | |
|---|---|---|---|---|
| 5,550,715 | A * | 8/1996 | Hawkins | 362/630 |
| 7,762,708 | B2 * | 7/2010 | Lee et al. | 362/632 |
| 7,766,536 | B2 * | 8/2010 | Peifer et al. | 362/633 |
| 7,798,701 | B2 * | 9/2010 | Mori et al. | 362/634 |
| 7,798,702 | B2 * | 9/2010 | Wu | 362/646 |
| 7,866,874 | B2 * | 1/2011 | Liu et al. | 362/634 |
| 7,918,598 | B2 * | 4/2011 | Peifer et al. | 362/612 |
| 8,125,588 | B2 * | 2/2012 | Pei | 349/58 |
| 2002/0030983 | A1 * | 3/2002 | Chou | 362/31 |
| 2005/0157500 | A1 * | 7/2005 | Chen et al. | 362/294 |

FOREIGN PATENT DOCUMENTS

| | | |
|---|---|---|
| TW | M315841 | 7/2007 |
| TW | 200949357 | 12/2009 |
| TW | 201005382 | 2/2010 |

* cited by examiner

*Primary Examiner* — John A Ward
(74) *Attorney, Agent, or Firm* — Cheng-Ju Chiang

(57) ABSTRACT

A backlight module comprises a light source circuit board having a plurality of light emitters disposed thereon; a securing component for supporting the light source circuit board rigidly, the securing component comprising a holding portion and an adhesive layer, the adhesive layer being utilized for assembling the light source circuit board and the securing component together to form an assembly; and a casing having a receiving slot, the assembly of the light source circuit board and the securing component being detachably disposed in the receiving slot, the holding portion being utilized for a user to grip when moving the securing component, and the holding portion having a locating hole for being fastened in the casing. The backlight module is capable of reducing the risk of scratching optical films and invasion by foreign objects in a replacement process of the light source circuit board, thereby increasing the lifespan of displays.

6 Claims, 5 Drawing Sheets

BACKLIGHT MODULE

TECHNICAL FIELD OF THE INVENTION

The present invention relates to a backlight module, and more particularly, to a backlight module having a replaceable light source circuit board.

BACKGROUND OF THE INVENTION

Liquid crystal displays (LCDs) have become an essential part for a person living in the modern life. For LCDs, LCD TVs and computer monitors are most common applications. The applications of LCDs further extend to personal information related electronic products such as smart mobile phones, hand-held game consoles, digital photo frames, and electronic book devices, etc. Generally, the LCD has a backlight module incorporated for displaying image. A conventional backlight module mainly consists of a light source (or light sources), a light guiding plate, plural optical films, and other fastening components. The light source commonly used is a cold cathode tube or a light emitting diode (LED). Recently, the LED is gradually replacing the cold cathode tube since the LED has many advantages including higher brightness, higher color saturation, and free of mercury additives, etc.

Nowadays, the backlight module tends to be designed into a lighter and thinner module. Further, since the LED is smaller in size and much brighter in comparison, a LED packaged backlight module has gradually been developed. However, when LED light sources are installed in small confined spaces and when the LED light sources are activated, a great amount of heat generated thereafter is difficult to be dissipated and this causes the lifespan of LEDs to be reduced. If a single LED is damaged or the emitting efficiency of a part of LEDs is lowered, the display quality with respect to the entire backlight module will be affected. In the afore-said situation, the backlight module may be dismantled or discarded from being used. Otherwise, the damaged LED light source of the backlight module will need to be replaced with a new one and it takes time and effort to do so. Furthermore, during the replacement process, the risk of scratching optical films and invasion by foreign objects may be increased.

Taiwan Patent Publication No. 200949357 discloses a backlight module, in which a clamping mechanism and a locating pin are utilized to fasten an LED circuit board on a securing component. The securing component is provided for facilitating putting in or taking out so as to replace the LED circuit board conveniently. A buckling mechanism is disposed on the securing component for assembling and fixing the securing component to the backlight module. However, the LED circuit board is merely supported by some portions of the securing component. The LED circuit board may easily be scratched or deformed in the replacement process.

Taiwan Utility Patent No. M315841 discloses a backlight module that provides a securing board to fasten an LED bar thereon so as to reduce the damages in the replacement process. However, the assembly of the LED bar and the securing board achieves the replacement of the light sources through a long, narrow cleft at a shell of the backlight module. Further, the cleft will affect the structural strength of the entire backlight module. In addition, the LED bar is mounted on the securing board by fastening screws. Therefore, it is very inconvenient to install and remove the LED bar. In other words, the time to replace the LED bar is a burden and the manufacturing cost is increased as well.

Therefore, there is a need to provide a backlight module for solving the above-mentioned problems.

SUMMARY OF THE INVENTION

An objective of the present invention is to provide a backlight module for reducing the risk of scratching optical films and invasion by foreign objects while replacing a light source circuit board, thereby increasing the lifespan of displays.

Another objective of the present invention is to provide a backlight module for maintaining the structural strength of the entire backlight module and at the same time achieving the purpose and functionality of replacing light emitters.

Still another objective of the present invention is to provide a backlight module for improving the efficiency of replacing a light source circuit board.

According to the above objectives, the present invention provides a backlight module, which comprises: a light source circuit board having a plurality of light emitters disposed thereon; a securing component for supporting the light source circuit board rigidly, the securing component comprising a holding portion and an adhesive layer, the adhesive layer being utilized for assembling the light source circuit board and the securing component together to form an assembly; and a casing having a receiving slot, the assembly of the light source circuit board and the securing component being detachably disposed in the receiving slot, the holding portion being utilized for a user to grip when moving the securing component, and the holding portion having a locating hole for being fastened in the casing.

In another aspect, the present invention provides a backlight module, which comprises: a light source circuit board having a plurality of light emitters disposed thereon; a securing component for supporting the light source circuit board rigidly, the securing component comprising a holding portion, a side plate, and an adhesive layer disposed on the side plate, the light source circuit board being adhered to the side plate through the adhesive layer, thereby assembled with the securing component to form an assembly; and a casing having a receiving slot, the assembly of the light source circuit board and the securing component being detachably disposed in the receiving slot, the holding portion being utilized for a user to grip when moving the securing component.

In still another aspect, the present invention provides a backlight module, which comprises: a light source circuit board having a plurality of light emitting diodes disposed thereon; a securing component comprising a holding portion, a bottom plate, a side plate, and an adhesive layer disposed on the side plate, the light source circuit board being adhered to the side plate through the adhesive layer, thereby assembled with the securing component to form an assembly, the bottom plate and the side plate being perpendicular to each other, the bottom plate and the side plate utilized for supporting the light source circuit board rigidly; and a casing having a receiving slot, the assembly of the light source circuit board and the securing component being detachably disposed in the receiving slot, the holding portion being utilized for a user to grip when moving the securing component.

In the present invention, during replacing the assembly of the light source circuit board and the securing component, the risk of scratching optical films and invasion by foreign objects can be reduced, thereby increasing the lifespan of displays. Moreover, the securing component is strong structurally and not easily deformed in the replacement process. In addition, the gripping function provided by the holding portion of the securing component makes it more convenient to replace the assembly of the light source circuit board and the securing component.

In the present invention, the light source circuit board is adhered to the securing component through the adhesive layer; therefore, it is very convenient to replace the light source circuit board. The present invention can reduce the time to dismantle the assembly of the securing component and the light source circuit board. In addition, the adhesive layer is preferably implemented by a thermal conductive adhesive tape. The thermal conductive adhesive tape is beneficial to dissipate heat from the light emitters.

BRIEF DESCRIPTION OF THE DRAWINGS

The present invention will be described in details in conjunction with the appending drawings.

DETAILED DESCRIPTION OF THE INVENTION

In order to make the present invention to be understood more easily, embodiments for carrying out the present invention will be described in details in conjunction with the appending drawings. In the specification, those elements having similar functions or similar structures are labeled with the same reference numbers.

Figure 1:
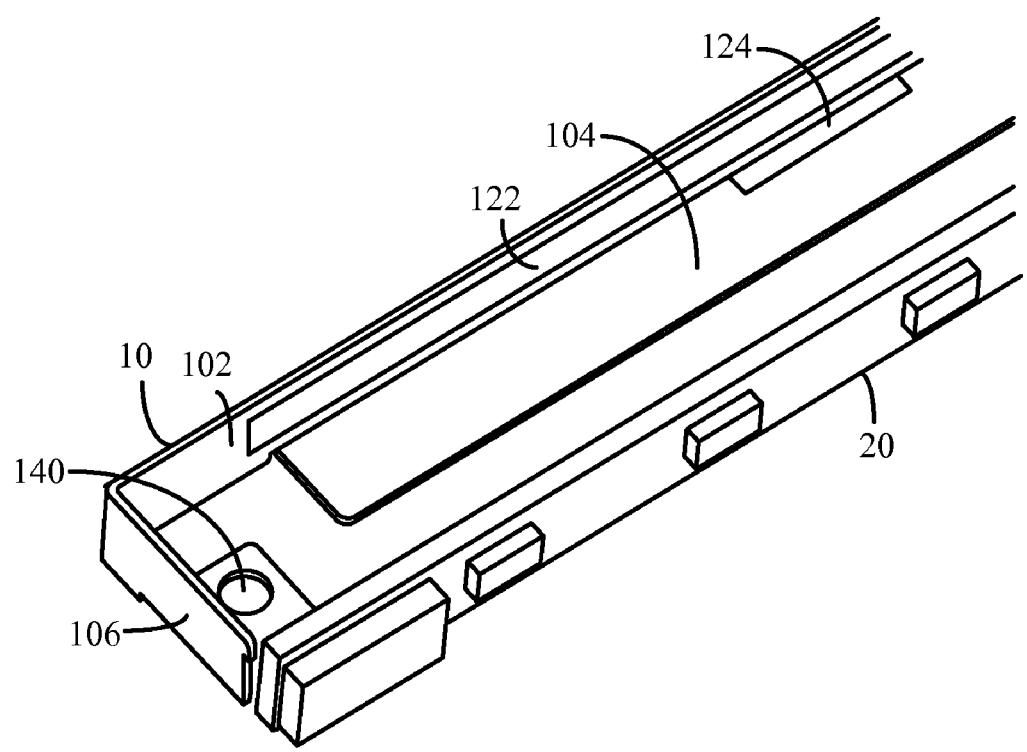
FIG. 1 is a structural diagram schematically showing a securing component and a light source circuit board of a backlight module implemented according to the preset invention.

FIG. 1 is a structural diagram showing a securing component 10 and a light source circuit board 20 of a backlight module implemented according to the preset invention. The securing component 10 is a rigid body and comprises a side plate 102, a bottom plate 104, and a holding portion 106. The light source circuit board 20 has a plurality of light emitters disposed thereon and is capable of providing light for the backlight module. The light emitters can be light emitting diodes or field-effect light emitters. The securing component 10 is utilized for supporting the light source circuit board 20 rigidly.

As shown in FIG. 1, the side plate 102 and the bottom plate 104 of the securing component 10 form an L-shaped structure for providing a powerful support to the light source circuit board 20. The side plate 102, the bottom plate 104, and the holding portion 106 of the securing component 10 are perpendicular to each other. This mutually perpendicular structure is not only simplified but also easily to be manufactured, as well as strong and not easily be deformed.

Figure 2A:
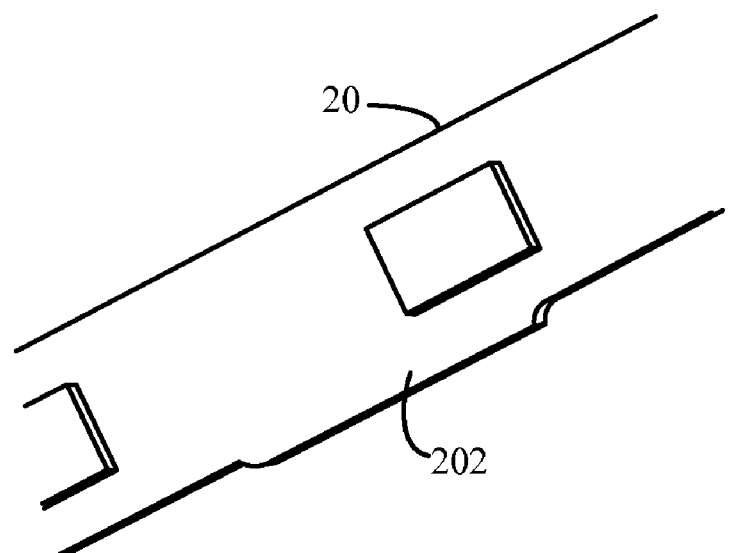
FIG. 2a is a diagram showing a detailed structure of the light source circuit board of the present invention.
Figure 2B:
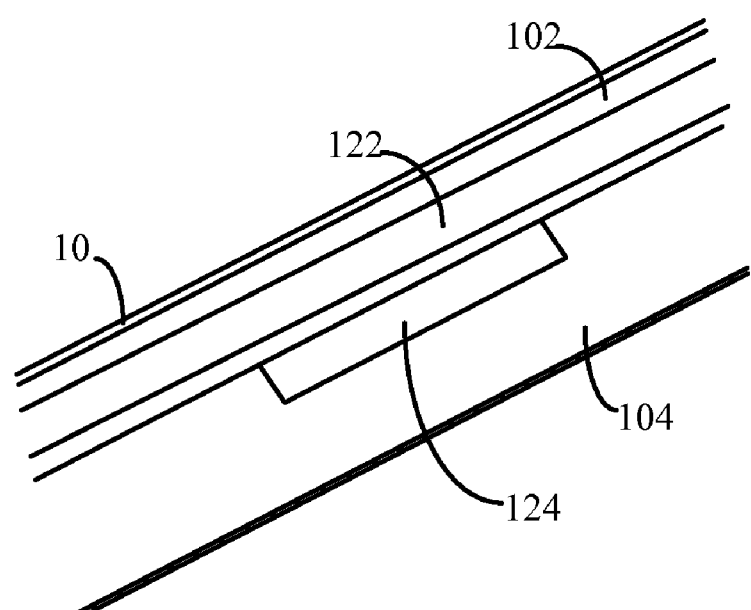
FIG. 2b is a diagram showing a detailed structure of the securing component of the present invention.
Figure 3:
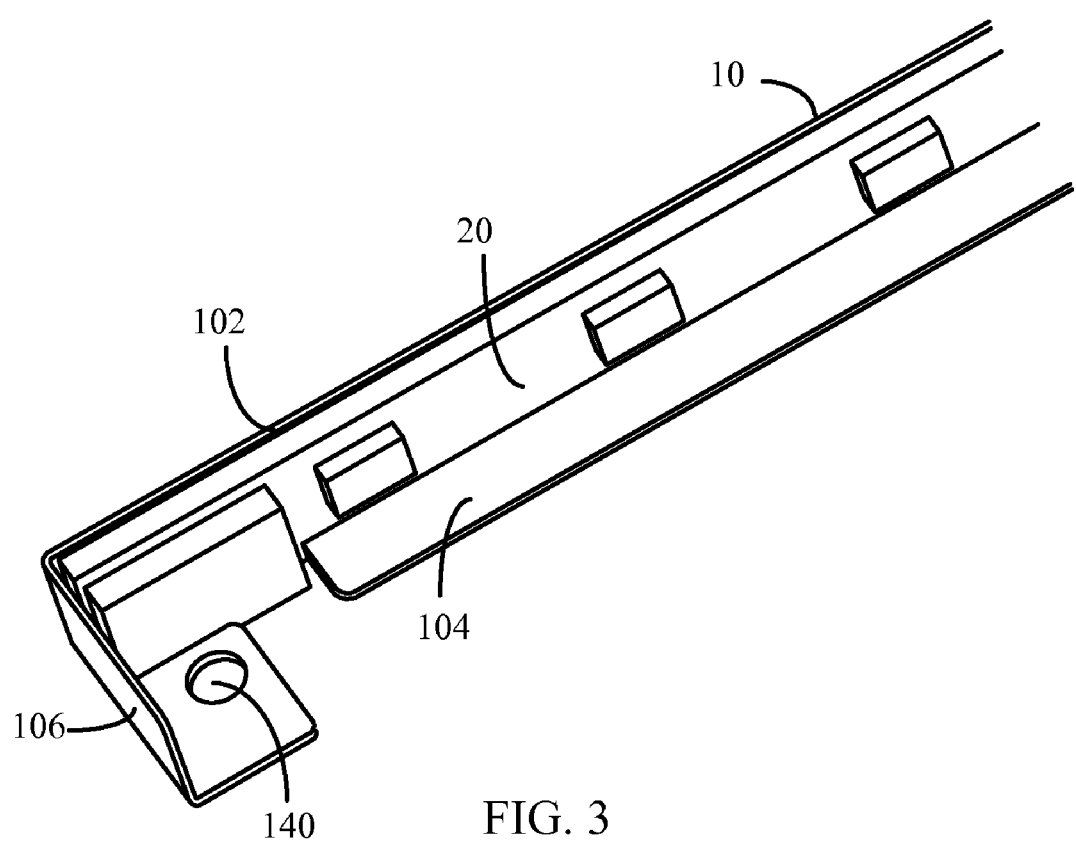
FIG. 3 is a schematic diagram showing the light source circuit board and the securing component being assembled together to form an assembly according to the present invention.

FIG. 2a is a diagram showing a detailed structure of the light source circuit board 20 of the present invention. FIG. 2b is a diagram showing a detailed structure of the securing component 10 of the present invention. FIG. 3 is a schematic diagram showing the light source circuit board 10 and the securing component 10 being assembled together to form an assembly in the present invention.

Please refer to FIGS. 1, 2a, 2b, and 3. The securing component 10 has an adhesive layer 122. The adhesive layer 122 is disposed on the side plate 102 of the securing component 10. The light source circuit board 20 is adhered to the side plate 102 of the securing component 10 through the adhesive layer 122, thereby assembled with the securing component 10. The adhesive layer 122 is preferably to be implemented by a thermal conductive adhesive tape. The thermal conductive adhesive tape not only provides adhesion but also helps heat transmission, e.g., beneficial to dissipate heat from the light emitters.

Please refer to FIGS. 1, 2a, 2b, and 3. The bottom plate 104 of the securing component 10 has a slit 124. The light source circuit board 20 has a protrusion 202 matching the slit 124. The protrusion 202 of the light source circuit board 20 and the slit 124 of the securing component 10 are well designed so the protrusion 202 and the slit 124 are able to be engaged with each other.

Please refer to FIGS. 1, 2a, 2b, and 3. When assembling the securing component 10 and the light source circuit board 20, the protrusion 202 of the light source circuit board 20 is aligned with the slit 124 of the bottom plate 104 of the securing component 10. When the protrusion 202 and the slit 124 are engaged with each other, the light source circuit board 20 is adhered to the side plate 102 of the securing component 10 through the adhesive layer 122. Finally, the securing component 10 and the light source circuit board 20 are completely assembled as shown in FIG. 3.

It is noted that the protrusion 202 and the slit 124 not merely provide an alignment function for the securing component 10 and the light source circuit board 20, but also prevent the securing component 10 deviating from the light source circuit board 20, i.e., avoiding a position deviation.

Figure 4B:
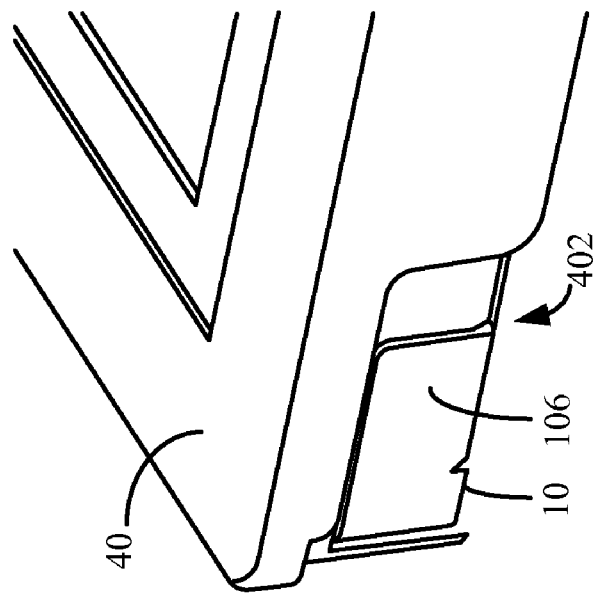
FIG. 4b is a structural diagram showing the assembly of the light source circuit board and the securing component being completely inserted into the casing of the backlight module according to the present invention.
Figure 4A:
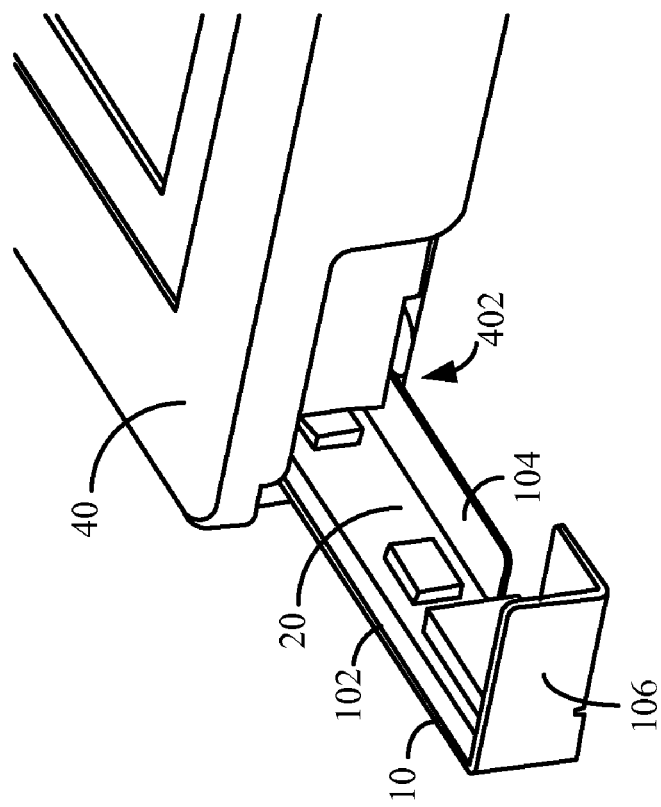
FIG. 4a is a structural diagram showing the assembly of the light source circuit board and the securing component being detachably disposed in a casing of the backlight module according to the present invention.

FIG. 4a is a structural diagram showing the assembly of the light source circuit board 20 and the securing component 10 being detachably disposed in a casing 40 of the backlight module according to the present invention. FIG. 4b is a structural diagram showing the assembly of the light source circuit board 20 and the securing component 10 being completely inserted into the casing 40 of the backlight module according to the present invention.

Please refer to FIGS. 4a and 4b. The backlight module of the present invention comprises a casing 40 which is an appropriately designed and molded plastic frame. The casing 40 has a receiving slot 402 of which an opening matches the size of the securing component 10. The assembly of the light source circuit board 20 and the securing component 10 is detachably disposed in the receiving slot 402. Moreover, a slide rail (not shown) is disposed in the receiving slot 402 for easily removing or replacing the securing component 10.

Please refer to FIGS. 4a and 4b. While removing or replacing the assembly of the light source circuit board 20 and the securing component 10, the holding portion 106 of the securing component 10 is utilized for a user to grip so that the assembly of the light source circuit board 20 and the securing component 10 can be removed or replaced more easily. Moreover, the size of the holding portion 106 of the securing component 10 matches the opening of the receiving slot 402 of the casing 40. Therefore, when the securing component 10 is inserted into the receiving slot 402, the holding portion 106 is capable of covering the opening of the receiving slot 402. At the time, a little slit is retained for conveniently taking out the securing component 10 by gripping the holding portion 106. As shown in FIG. 4b, the assembly of the light source circuit board 20 and the securing component 10 is completely inserted into the receiving slot 402 of the casing 40.

Figure 5:
FIG. 5 is a structural diagram showing a shell plate of the backlight module according to the present invention.

FIG. 5 is a structural diagram showing a shell plate 50 of the backlight module implemented according to the present invention. The backlight module of the present invention further comprises a shell plate 50 assembled with the casing 40. The shell plate 50 is located in rear of the backlight module. In one embodiment, the shell plate 50 has a through hole 502 and the securing component 10 has a locating hole 140 corresponding to the through hole 502. When the assembly of the light source circuit board 20 and the securing component 10 is completely inserted to the receiving slot 402 of the casing 40, the through hole 502 of the shell plate 50 and the locating hole 140 of the securing component 10 are bolted together by tightening screws and thereby the assembly of the light source circuit board 20 and the securing component 10 is fixed with the casing 40 and the shell plate 50. When the light source circuit board 20 is damaged and needs to be replaced with a new one, a replacement operation is performed as follows: taking off the screws by a simply tool such as a flat-bladed screwdriver and then taking out the assembly of the light source circuit board 20 and the securing component 10 from the little slit at the opening of the receiving slot 402 by gripping the holding portion 106.

In the present invention, the securing component 10 and the light source circuit board 20 are assembled and fixed together to form an assembly in advance and then inserted into the receiving slot 402 of the casing 40. Therefore, in the replacement process, the risk of scratching optical films and invasion by foreign objects can be reduced, thereby increasing the lifespan of displays. Moreover, the side plate 102 and the bottom plate 104 of the securing component 10 forms an L-shaped structure. The side plate 102, the bottom plate 104, and the holding portion 106 are perpendicular to each other. Therefore, the assembly of the light source circuit board 20 and the securing component 10 is strong structurally and this structure is not easily being deformed in the replacement process. It is easily to push the assembly of the light source circuit board 20 and the securing component 10 to arrange that in a predetermined location so as to achieve the purpose of replacing light emitters. In addition, the gripping function provided by the holding portion 106 of the securing component 10 makes it more convenient for replacing the assembly of the light source circuit board 20 and the securing component 10.

In the present invention, the light source circuit board 20 is adhered to the securing component 10 through the adhesive layer 122. Therefore, it is very convenient to replace the light source circuit board 20. In other words, only little effort is needed to separate the light source circuit board 20 and the securing component 10. The present invention can reduce the time to dismantle the securing component 10 and the light source circuit board 20, and is able to reduce the manufacturing cost. In addition, the adhesive layer 122 is preferably to be implemented by a thermal conductive adhesive tape. The thermal conductive adhesive tape is beneficial for dissipating heat from the light emitters.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A backlight module, comprising:
a light source circuit board having a plurality of light emitters disposed thereon;
a securing component for supporting the light source circuit board rigidly, the securing component comprising a holding portion, a bottom plate, a side plate and an adhesive layer provided on the side plate, the light source circuit board being adhered to the side plate of the securing component through the adhesive layer, the bottom plate having a slit, the light source circuit board having a protrusion matching the slit, the protrusion and the slit being engaged with each other to align the light source circuit board with the securing component, the light source circuit board and the securing component being assembled together to form an assembly; and
a casing having a receiving slot, the assembly of the light source circuit board and the securing component being detachably disposed in the receiving slot, the holding portion being utilized for a user to grip when moving the securing component, and the holding portion having a locating hole for being fastened in the casing.

2. The backlight module of claim 1, wherein the side plate and the bottom plate of the securing component form an L-shaped structure.

3. The backlight module of claim 1, wherein the size of the holding portion matches an opening of the receiving slot of the casing.

4. The backlight module of claim 1, wherein the adhesive layer is implemented by a thermal conductive adhesive tape.

5. The backlight module of claim 1 further comprising a shell plate assembled with the casing, the shell plate has a through hole, the locating hole of the securing component corresponds to the through hole, and the through hole and the locating hole are bolted together.

6. The backlight module of claim 1, wherein the light emitters comprise light emitting diodes or field-effect light emitters.

* * * * *